(12) United States Patent
Clark et al.

(10) Patent No.: US 11,048,745 B2
(45) Date of Patent: Jun. 29, 2021

(54) COGNITIVELY IDENTIFYING FAVORABLE PHOTOGRAPH QUALITIES

(71) Applicant: INTERNATIONAL BUSINESS MACHINES CORPORATION, Armonk, NY (US)

(72) Inventors: Adam T. Clark, Mantorville, MN (US); Jeffrey K. Huebert, Byron, MN (US); Aspen Payton, Byron, MN (US); John Petri, St. Charles, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 16/015,548

(22) Filed: Jun. 22, 2018

(65) Prior Publication Data

US 2019/0392039 A1    Dec. 26, 2019

(51) Int. Cl.
*G06F 16/51*   (2019.01)
*G06F 16/54*   (2019.01)
*G06F 16/28*   (2019.01)

(52) U.S. Cl.
CPC .......... *G06F 16/51* (2019.01); *G06F 16/285* (2019.01); *G06F 16/54* (2019.01)

(58) Field of Classification Search
None
See application file for complete search history.

(56) References Cited

U.S. PATENT DOCUMENTS

| | | |
|---|---|---|
| 6,222,538 B1 | 11/1989 | Yamanami et al. |
| 6,526,234 B1 | 2/2003 | Malloy Desormeaux |
| 7,668,454 B2 | 2/2010 | Battles |
| 8,041,076 B1 | 10/2011 | Bourdev |
| 8,238,618 B2 | 8/2012 | Ogawa |
| 9,082,047 B2 | 7/2015 | Marchesotti |
| 9,465,817 B2 | 10/2016 | Shah et al. |
| 9,509,648 B2 | 11/2016 | DeLuca et al. |

(Continued)

FOREIGN PATENT DOCUMENTS

| | | |
|---|---|---|
| JP | 2003219218 A | 7/2003 |
| WO | 2006117942 A1 | 11/2006 |

OTHER PUBLICATIONS

Mell, et al., "The NIST Definition of Cloud Computing," National Institute of Standards and Technology, U.S. Department of Commerce, Special Publication 800-145, Sep. 2011, pp. 1-7.

(Continued)

*Primary Examiner* — Wilson Lee
(74) *Attorney, Agent, or Firm* — Kenneth Han (57) ABSTRACT

A method, computer system, and computer program product for determining qualities of user favorable photographs are provided. The embodiment may include receiving a plurality of photographs from an electronic device. The embodiment may also include parsing each photograph. The embodiment may further include calculating a favorability value of each photograph. The embodiment may also include determining whether the favorability value of each photograph exceeds a favorability threshold value. The embodiment may further include organizing the received photographs into one or more clusters based on features of each photograph. The embodiment may also include generating a classification model for each cluster.

20 Claims, 6 Drawing Sheets

(56) References Cited

U.S. PATENT DOCUMENTS

| | | | |
|---|---|---|---|
| 9,659,384 B2 | 5/2017 | Shaji et al. | |
| 10,116,859 B2 | 10/2018 | Matsunaga | |
| 10,425,578 B1 | 9/2019 | Westheimer | |
| 2005/0007468 A1 | 1/2005 | Stavely et al. | |
| 2006/0197990 A1* | 9/2006 | Myodo | H04N 1/448 358/3.06 |
| 2010/0306267 A1* | 12/2010 | Zamkoff | G06F 11/1464 707/783 |
| 2011/0050983 A1* | 3/2011 | Takeda | H04N 5/232123 348/353 |
| 2011/0052097 A1 | 3/2011 | Sundstrom et al. | |
| 2011/0149094 A1* | 6/2011 | Chen | H04N 5/23261 348/208.3 |
| 2011/0170755 A1* | 7/2011 | Buelow | G06T 7/0012 382/128 |
| 2012/0243052 A1* | 9/2012 | Kakutani | H04N 1/4051 358/3.13 |
| 2014/0176748 A1* | 6/2014 | Cohen | H04N 5/23206 348/222.1 |
| 2015/0036934 A1* | 2/2015 | Movellan | G06K 9/6202 382/197 |
| 2015/0055890 A1* | 2/2015 | Lundin | G06F 16/40 382/306 |
| 2015/0077574 A1 | 3/2015 | Jayaraj | |
| 2015/0295867 A1 | 10/2015 | DeLuca | |
| 2016/0219306 A1* | 7/2016 | Pettersson | H04N 21/6379 |
| 2017/0270970 A1* | 9/2017 | Ho | G06K 9/00288 |
| 2018/0039879 A1 | 2/2018 | Shaji et al. | |
| 2018/0046886 A1* | 2/2018 | Greenberger | C08L 23/16 |
| 2018/0157800 A1* | 6/2018 | Ravishankar | G16H 50/20 |
| 2018/0164990 A1* | 6/2018 | Lin | G11B 27/34 |
| 2019/0042600 A1* | 2/2019 | Guo | G06F 16/5866 |
| 2019/0206441 A1* | 7/2019 | De la Torre | G06K 9/00281 |
| 2019/0228270 A1* | 7/2019 | DeLuca | G06F 16/5846 |
| 2019/0236099 A1* | 8/2019 | Guo | G06F 16/51 |
| 2019/0354802 A1* | 11/2019 | Lin | G06K 9/6215 |
| 2019/0392039 A1 | 12/2019 | Clark | |
| 2019/0394393 A1 | 12/2019 | Clark | |
| 2020/0251073 A1* | 8/2020 | Kano | G10H 1/0008 |

OTHER PUBLICATIONS

Anonymous, "System and method in camera systems to help the user take the perfect picture", An Ip.com Prior Art Database Technical Disclosure, IP.com No. IPCOM000251807D, IP.com Electronic Publication Date: Dec. 5, 2017.

IBM: List of IBM Patents or Patent Applications Treated as Related (Appendix P), Apr. 9, 2020, 2 pages.

* cited by examiner

COGNITIVELY IDENTIFYING FAVORABLE PHOTOGRAPH QUALITIES

BACKGROUND

The present invention relates, generally, to the field of computing, and more particularly to image recognition and analysis systems.

Image recognition and analysis systems may relate to a technology that is capable of identifying certain information from digital images such as photographs by utilizing a computer or electrical device. The image-taking electrical devices may include digital cameras or mobile phones. For example, if a user takes a plurality of photographs using an electrical device, software or hardware may cluster the photographs and sort out libraries of photographs based on the presence of certain objects, scenery or particular individuals such as siblings, parents or friends. Image recognition and analysis systems may be interrelated with other tasks such as scanning bar codes, identifying vehicle license plates or facial recognition for security purposes. The applications of image recognition and analysis system are continuously expanding.

SUMMARY

According to one embodiment, a method, computer system, and computer program product for determining qualities of user favorable photographs are provided. The embodiment may include receiving a plurality of photographs from an electronic device. The embodiment may also include parsing each photograph. The embodiment may further include calculating a favorability value of each photograph. The embodiment may also include determining whether the favorability value of each photograph exceeds a favorability threshold value. The embodiment may further include organizing the received photographs into one or more clusters based on features of each photograph. The embodiment may also include generating a classification model for each cluster.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to image recognition and analysis systems. The following described exemplary embodiments provide a system, method, and program product to, among other things, build a model which may identify qualities of user-favorable photographs for a multitude of categories. Therefore, the present embodiment has the capacity to improve the technical field of image recognition and analysis systems by efficiently allowing users to determine whether a particular photograph is user-favorable or unfavorable in a number of different ways and discard less quality or unfavorable photographs, which eventually may guide users to take better quality photographs in the future. Moreover, the present embodiment may take into account various social groups so that photographs may be considered favorable or unfavorable differently given a particular audience or social groups.

As previously described, image recognition and analysis systems may relate to a technology that is capable of identifying certain information from digital images such as photographs by utilizing a computer or electrical device. For example, if a user takes a plurality of photographs using an electrical device, software or hardware may cluster the photos and sort out libraries of photographs based on the presence of certain objects, scenery or certain individuals such as siblings, parents or friends. Image recognition and analysis system may be interrelated with other tasks such as scanning bar codes, identifying vehicle license plates or facial recognition for security purposes.

Today, sharing photographs has become a very important aspect of people's lives. For example, thousands of photos are shared every day on social media sites such as Facebook® (Facebook and all Facebook-related trademarks and logos are trademarks or registered trademarks of Facebook, Inc. and/or its affiliates), Instagram® (Instagram and all Instagram-related trademarks and logos are trademarks or registered trademarks of Instagram, LLC. and/or its affiliates) or Snapchat® (Snapchat and all Snapchat-related trademarks and logos are trademarks or registered trademarks of Snap, Inc. and/or its affiliates). With the advancement of digital photography utilizing a digital camera or mobile phone, unlimited numbers of photographs are taken at people's fingertips. However, out of those unlimited number of photographs, it would be fair to say that only a fraction of photographs taken may be considered good pictures. As such, it may be advantageous to, among other things, implement a system capable of providing a method for which a user may determine favorable photographs in various ways and allow the users to take and keep only the favorable pictures so that the users can better preserve memories on user devices or a cloud environment.

According to one embodiment, user-ingested photographs may be analyzed by a cognitive photograph recommendation engine program to cluster the photographs into different groups so that different sets of important qualities may be considered when determining the favorability of a particular photograph. For example, photos can be separated as individual photos or into groups based on characteristics, such as indoor photos, outdoor photos, and selfies, etc. In at least one other embodiment, favorable pictures may be determined based on the number of likes it received on social media sites. Also, the embodiment may include a method for which a user may manually select a favorable picture or favorable pictures.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to cognitively identify favorable photograph qualities.

Figure 1:
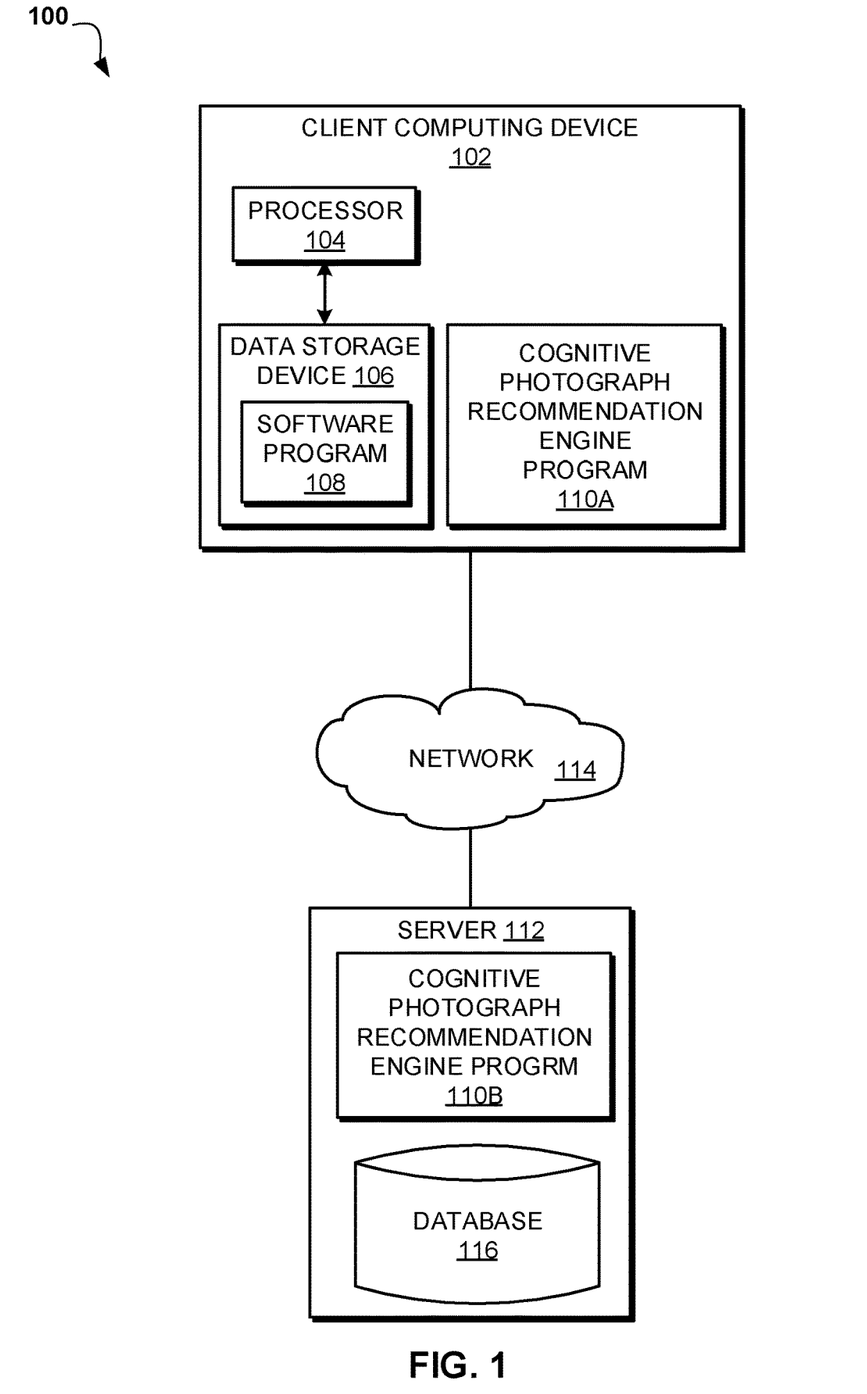
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a cognitive photograph recommendation engine program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a cognitive photograph recommendation engine program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the cognitive photograph recommendation engine program 110A, 110B may be a program capable of determining the qualities that make ideal photographs for a multitude of categories. The cognitive photograph recommendation engine program 110A, 110B may then generate a database that maintains information relevant to user-preferable photographs so that the cognitive photograph recommendation engine program 110A, 110B may help accurately determine favorability of subsequent photographs. The cognitive photograph recommendation process is explained in further detail below with respect to FIG. 2.

Figure 2:
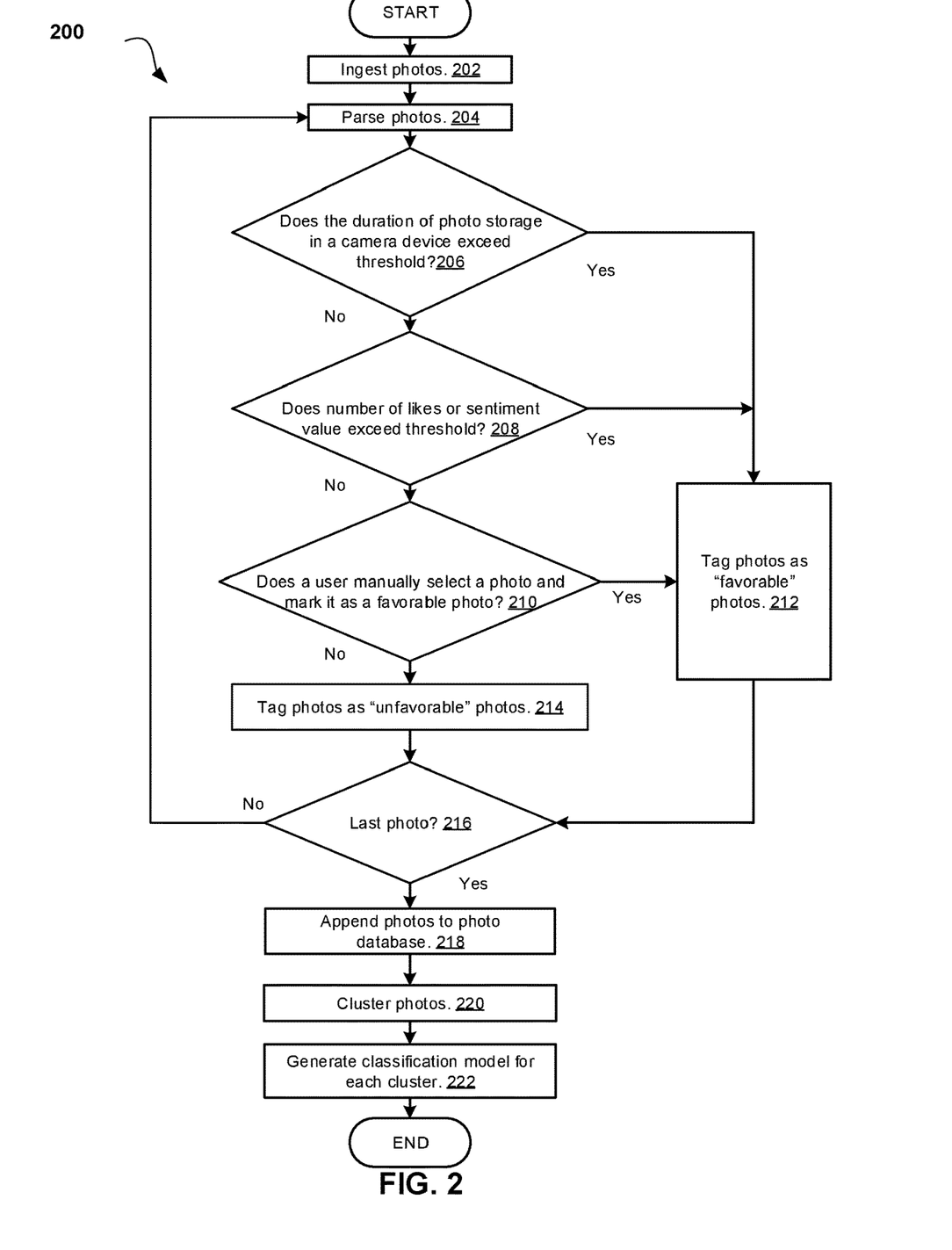
FIG. 2 is an operational flowchart illustrating a cognitive photograph recommendation process according to at least one embodiment.

FIG. 2 is an operational flowchart illustrating a cognitive photograph recommendation process 200 according to at least one embodiment. At 202, the cognitive photograph recommendation engine program 110A, 110B may ingest a user's photographs from various sources including individual pictures taken on a digital camera or mobile phone, photos from social media sites such as Facebook® or Instagram®. For example, if a user takes a selfie using a mobile phone, the user can have an option to upload the picture directly to the cognitive photograph recommendation engine program 110A, 110B or in the alternative, the user can upload the same picture to a social media site allowing the cognitive photograph recommendation engine program 110A, 110B to download the same picture from the same social media site for further analysis.

At 204, the cognitive photograph recommendation engine program 110A, 110B may parse the ingested photos in each cluster and analyze the photos to determine a user's favorability of each photo. Also, according to one embodiment, the cognitive photograph recommendation engine program 110A, 110B may parse the photos and determine a user's favorability of each photo by identifying how many days the photos have been kept on a camera device or mobile phone. In at least one other embodiment, the cognitive photograph recommendation engine program 110A, 110B may determine a user's favorability of each photo by identifying how many likes or positive comments the photo has received on social media sites. Additionally, in at least one other embodiment, the cognitive photograph recommendation engine program 110A, 110B may determine a user's favorability of each photo by allowing a user to manually choose whether a particular photo is favorable or not. Furthermore, a user may preconfigure the cognitive photograph recommendation engine program 110A, 110B to identify, ignore or set a threshold value of favorability for specific clusters of photographs or the cognitive photograph recommendation program 110A, 110B may run an algorithm to determine threshold values. For example, the cognitive photograph recommendation engine program 110A, 110B may determine that a threshold value of 30-days storage on a camera or mobile phone is appropriate when analyzing a cluster of selfies. On the other hand, the cognitive photograph recommendation engine program 110A, 110B may determine that a shorter period of storage is appropriate for a cluster of scenery photos. The cognitive photograph recommendation engine program 110A, 110B may also set threshold values with respect to negative or positive comments that have been received on social media sites.

At 206, the cognitive photograph recommendation engine program 110A, 110B may determine whether the number of days for which a particular photo has been stored on a camera device or mobile phone exceeds a threshold value. For example, if a user has kept a picture of two dogs for more than 30 days, the cognitive photograph recommendation engine program 110A, 110B may determine that the favorability of the photo exceeds the threshold value. If a user has kept a picture of a cat only for 10 days, then the cognitive photograph recommendation engine program 110A, 110B may determine that the favorability value does not exceed the threshold value. As described above, the cognitive photograph recommendation engine program 110A, 110B may apply different sets of threshold values to each different cluster. According to one embodiment, if the cognitive photograph recommendation program 110A, 110B determines that the storage days of the photo exceeds the threshold value (step 206, "Yes" branch), the cognitive photograph recommendation engine program 110A, 110B may continue to step 212 to tag the photos as "favorable" photos. If the cognitive photograph recommendation program 110A, 110B determines that the duration of the storage does not exceed the threshold value (step 206, "No" branch), the cognitive photograph recommendation engine program 110A, 110B may continue to step 208 to determine if the number of likes or sentiment value exceeds a preconfigured favorability threshold.

At 208, the cognitive photograph recommendation engine program 110A, 110B may determine whether the number of likes or sentiment value given to a particular photo from social media sites exceeds a preconfigured favorability threshold value. For example, if a user-uploaded photo received more than 50 likes on one of the social media sites such as Facebook® or Instagram®, the cognitive photograph recommendation engine program 110A, 110B may determine that the number of likes the photo received well exceed a preconfigured favorability threshold value and that the photo is a favorable photo. If a photo posted on the social media site received negative comments, such as, "this picture is gloomy" or "this picture is too dark", the cognitive photograph recommendation engine program 110A, 110B may, in accordance with the preconfigured sentiment value at 206, assign a negative value, or a value below the threshold value. According to one embodiment, if the cognitive photograph recommendation program 110A, 110B determines that the number of likes or the sentiment value exceeds the threshold value (step 208, "Yes" branch), the cognitive photograph recommendation engine program 110A, 110B may continue to step 212 to tag the photos as "favorable" photos. If the cognitive photograph recommendation program 110A, 110B determines that the number of likes or the sentiment value does not exceed the threshold value (step 208, "No" branch), the cognitive photograph recommendation engine program 110A, 110B may continue to step 210 to determine whether a user has manually selected a photo and marked that photo as favorable.

In at least one other embodiment, the cognitive photograph recommendation engine program 110A, 110B may analyze and weigh differently the number of likes or comments that photos received on social media sites based on the people who have responded to the photo. For example, the number of likes or comments that the family member of a user posted on a social media site may be weighed more heavily than the number of likes or comments from high school friends.

At 210, the cognitive photograph recommendation engine program 110A, 110B may determine whether a user manually selected a photo and marked it as a favorable photo. Photos that do not exceed the threshold value at step 206 or step 208 may be manually selected by a user and marked as a favorable photo. According to one embodiment, if the cognitive photograph recommendation program 110A, 110B determines that the user manually marked the photo as a favorable photo (step 210, "Yes" branch), the cognitive photograph recommendation engine program 110A, 110B may continue to step 212 to tag the photos as "favorable" photos. If the cognitive photograph recommendation program 110A, 110B determines that the user did not mark the photo as a favorable photo (step 210, "No" branch), the cognitive photograph recommendation engine program 110A, 110B may continue to step 214 to tag the photos as "unfavorable" photos. For example, even if a selfie was deleted from a mobile device within a short period of time and it has never received any comments or likes on any of the social media sites, a user still may elect to mark the picture as a favorable picture and tag the picture as a "favorable" photo. This would be a desirable feature in a situation where a person does not have many friends on social media sites and, as such, it may be difficult to exceed a threshold value based on the number of likes or a sentiment value associated with comments.

At 212, the cognitive photograph recommendation engine program 110A, 110B may tag photos that exceed the threshold value in steps 210 or 212 or manually marked favorable photos as "favorable" photos. The cognitive photo recommendation engine program 110A, 110B may assign each photo to a different set of favorable categories based on the characteristics of the photos. For example, a favorable picture with a dog may be assigned to a category of a picture with animals. In at least one other embodiment, the cognitive photograph recommendation engine program 110A, 110B may assign a confidence score to photos to indicate how confident the system is that the photo is either favorable or unfavorable.

At 214, the cognitive photograph recommendation engine program 110A, 110B may tag photos that do not exceed the threshold value in steps 210 or 212 or photos that are not manually marked as favorable as "unfavorable" photos. Such unfavorable photos may be assigned to different categories based on the characteristics of the photos. For example, if a user manually selects a selfie with sunglasses and marks it as an unfavorable photo, the cognitive photograph recommendation engine program 110A, 110B may tag the photo as unfavorable and assign it to a group of "unfavorable" selfie photographs.

Next, at 216, the cognitive photograph recommendation engine program 110A, 110B may determine whether there are any remaining photos to be parsed. According to one implementation, the cognitive photograph recommendation process 200 may continue if a photo is not the last photo to be parsed. If the cognitive photograph recommendation engine program 110A, 110B determines the photo is the last remaining photo that was ingested to be parsed (step 216, "Yes" branch), the cognitive photograph recommendation engine program 110A, 110B may continue to step 218. If the cognitive photograph recommendation engine program 110A, 110B determines the parsed photo is not the last remaining photo to be parsed (step 216, "No" branch), the cognitive photograph recommendation process 200 may return to step 204 to parse remaining photos.

At 218, the cognitive photograph recommendation engine program 110A, 110B may append the photos tagged as "favorable" and "unfavorable" photos to a photo database. For example, a favorable picture with a dog may be stored in a database tagged as a favorable photo. An unfavorable picture with a cat may be stored in database tagged as an unfavorable photo. The cognitive photograph recommendation engine program 110A, 110B may store all the photos that have been parsed and tagged as either "favorable" or "unfavorable" in a database so that the cognitive photograph recommendation engine program 110A, 110B may analyze and cluster the photos into different groups.

At 220, the cognitive photograph recommendation engine program 110A, 110B may utilize standard statistical analysis methods to cluster the photos appended to a photo database. The cognitive photograph recommendation engine program 110A, 110B may determine various sets of important qualities specific to each cluster of the photographs. Clusters may include, but are not limited to, individual photos, photos of specific people, group photos of one or more people, indoor photos, outdoor photos, scenery photos, and selfies. For example, if a user takes a photo containing the user and the spouse of the user, the cognitive photograph recommendation engine program 110A, 110B may cluster the photo and assign it to a "photo with spouse" group. If the same user takes a photo with a dog, the cognitive photograph recommendation engine program 110A, 110B may cluster the photo differently and assign it to a "photo with a dog" group. The cognitive photograph recommendation engine program 110A, 110B may cluster the photos and group the photos into more specific categories. For example, with respect to a photo with a dog, the more specific category may include "a photo with a dog kneeling on the floor" or "a photo with two dogs lying down on the floor".

Next at 222, the cognitive photograph recommendation engine program 110A, 110B may generate classification models for each cluster. For example, the cognitive photograph recommendation engine program 110A, 110B may analyze the characteristics of the clustered photos within a specific category. For example, with respect to "a photo with a dog kneeling on the floor" or "a photo with two dogs lying down on the floor", the cognitive photograph recommendation engine program 110A, 110B may generate classification models containing detailed information as to brightness, posture of the objects, angles and/or size, etc.

Figure 3:
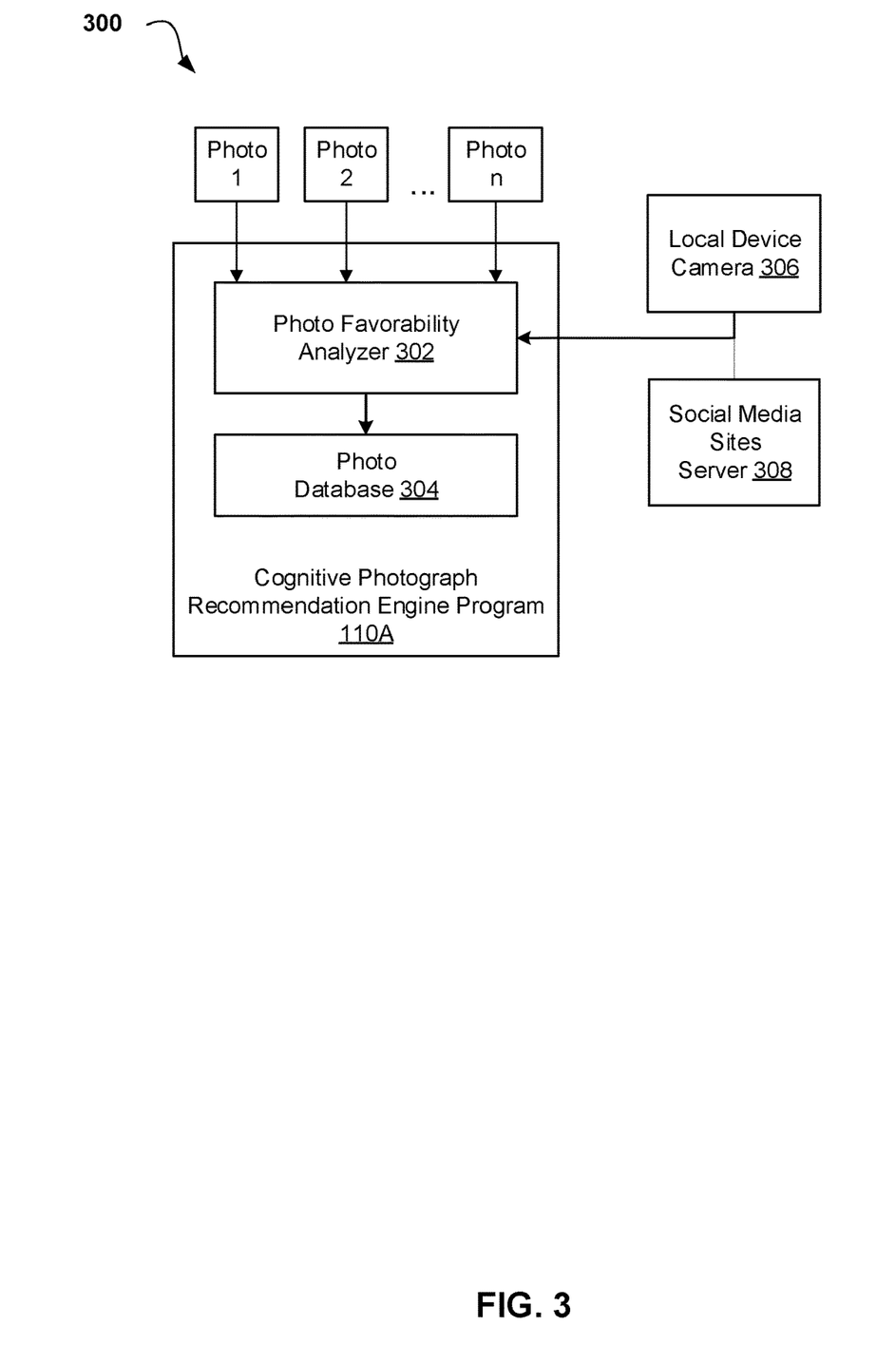
FIG. 3 is a functional block diagram of a cognitive photograph recommendation platform according to at least one embodiment.

Referring now to FIG. 3, a functional block diagram of a cognitive photograph recommendation platform 300 is depicted according to at least on embodiment. The cognitive photograph recommendation platform may include the cognitive photograph recommendation engine program 110A installed on the client computing device 102 that may ingest one or more user photographs. The cognitive photograph recommendation engine program 110A may include a photo favorability analyzer 302 and a favorable photo database 306. Additionally, the photo favorability analyzer 302 may receive data (e.g., images) from a local device camera 306 either internally installed or externally connected to the client computing device 102 and/or social media sites server 308. The photo favorability analyzer 302 may utilize image recognition technology to determine user favorability of the received image data. The photo favorability analyzer 302 may first analyze and cluster each ingested photo into different groups of pictures. Once the photo favorability analyzer 302 has determined clusters of the ingested photos, the photo favorability analyzer 302 may apply classification models to each photo to determine favorability of each photo. The photo favorability analyzer 302 then may extract information from favorable photos and generate the photo database 304. The photo favorability analyzer 302 may also receive photos captured by a local device camera 306 and manually supplemented by the user through a graphical user interface.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the cognitive photograph recommendation engine program 110A, 110B may ingest and analyze photos transmitted via instant messaging systems or email. Additionally, in at least one other embodiment, the cognitive photograph recommendation engine program 110A, 110B may interact with and directly download photos from cloud-computing platforms.

Figure 4:
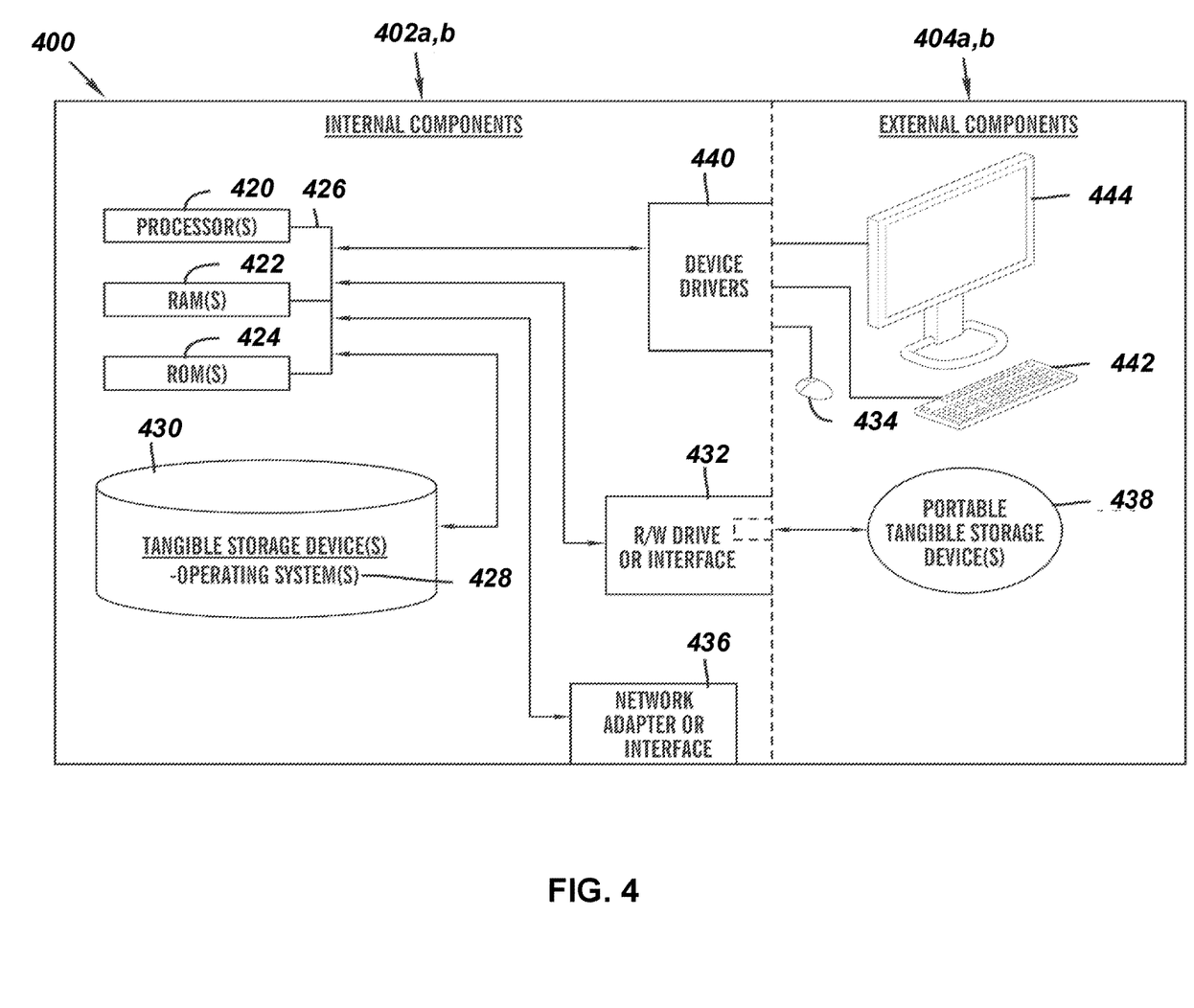
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the cognitive photograph recommendation engine program 110A in the client computing device 102 and the cognitive photograph recommendation engine program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the cognitive photograph recommendation engine program 110A, 110B, can be stored on one or more of the respective portable computer-readable tangible storage devices 438, read via the respective R/W drive or interface 432 and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the cognitive photograph recommendation engine program 110A in the client computing device 102 and the cognitive photograph recommendation engine program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the cognitive photograph recommendation engine program 110A in the client computing device 102 and the cognitive photograph recommendation engine program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
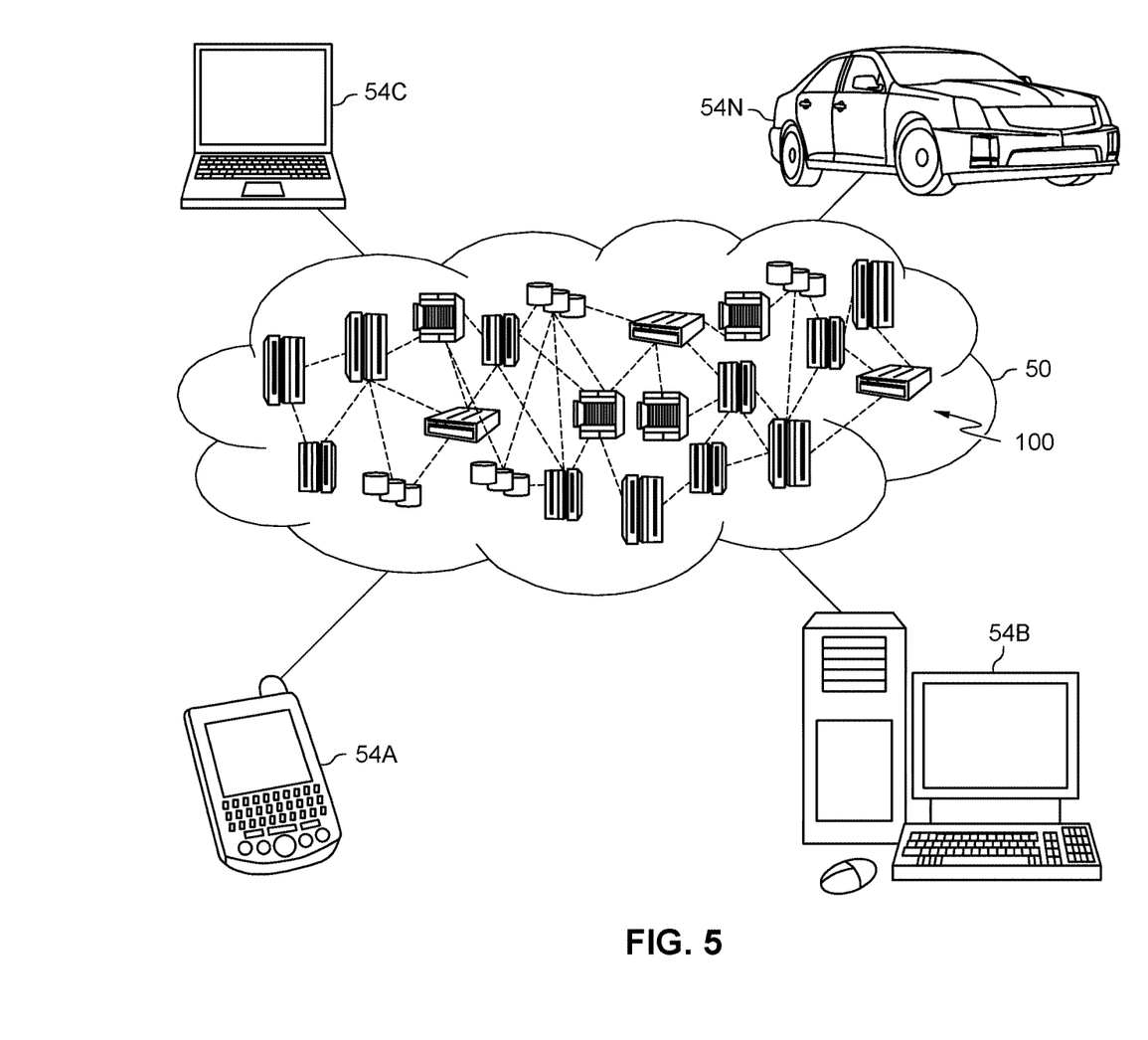
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
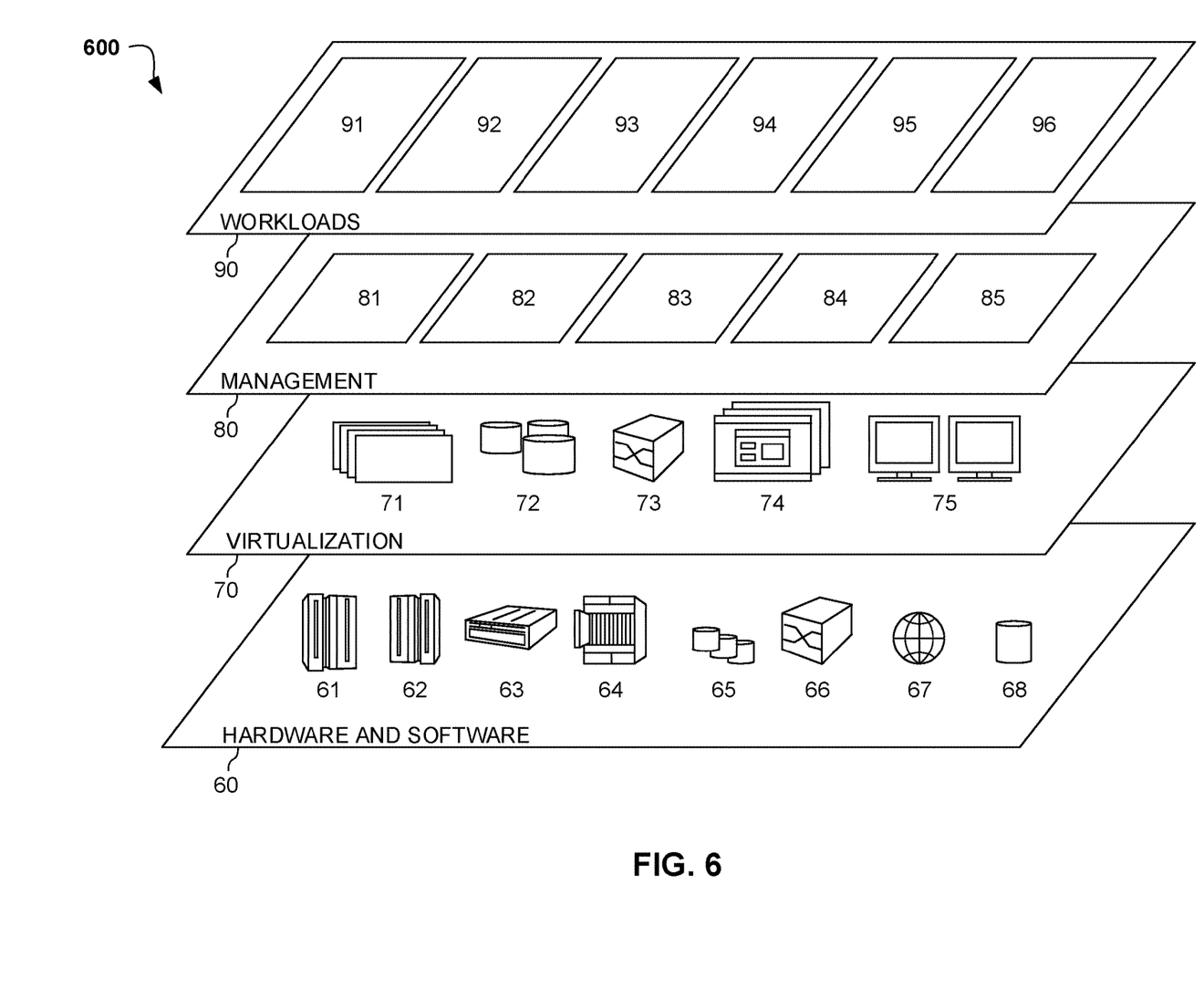
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive photograph recommendation 96. Cognitive photograph recommendation 96 may relate generating a database of personal favorable and unfavorable photographs previously entered by a user, monitoring various databases or social media sites for favorable photographs so that cognitive photograph recommendation 96 may determine the characteristics of the favorable photographs.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for determining qualities of user favorable photographs, the method comprising:
   receiving, by a processor, a plurality of photographs from an electronic device;
   parsing each photograph;
   calculating a favorability value of each photograph;
   determining whether the favorability value of each photograph exceeds a favorability threshold value;
   organizing the received photographs into one or more clusters based on features of each photograph, wherein a threshold value of favorability for each cluster is determined and each cluster is assigned different sets of threshold values, wherein the threshold value of favorability for each cluster is determined based on a preconfigured storage duration assigned to each of the clusters and a common classification or a common type of the organized photographs in each of the clusters; and
   generating a classification model for each cluster.

2. The method of claim 1, further comprising:
   identifying photographs that exceed the favorability threshold value; and
   generating a personal favorable photo database to store the photographs that exceed the favorability threshold value.

3. The method of claim 1, further comprising:
   identifying photographs that do not exceed the favorability threshold value; and
   generating a personal unfavorable photo database to store the photographs that do not exceed the favorability threshold value.

4. The method of claim 1, wherein the favorability threshold value for each photograph is determined by a user's manual selection of favorable or unfavorable photographs.

5. The method of claim 1, wherein the favorability threshold value for each photograph is determined by a number of likes or a sentiment of one or more comments that each photograph received on a social media platform.

6. The method of claim 1, wherein the favorability threshold value for each photograph is determined by a duration for which the photographs have been stored on a user device.

7. The method of claim 1, wherein a basis for organizing the received photographs into one or more clusters is selected from a group consisting of indoor photographs, outdoor photographs, scenery photographs, selfies, photographs depicting different number of people, and photographs depicting a specific individual.

8. A computer system for determining qualities of user favorable photographs, the computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

receiving, by a processor, a plurality of photographs from an electronic device;

parsing each photograph;

calculating a favorability value of each photograph;

determining whether the favorability value of each photograph exceeds a favorability threshold value;

organizing the received photographs into one or more clusters based on features of each photograph, wherein a threshold value of favorability for each cluster is determined and each cluster is assigned different sets of threshold values, wherein the threshold value of favorability for each cluster is determined based on a preconfigured storage duration assigned to each of the clusters and a common classification or a common type of the organized photographs in each of the clusters; and generating a classification model for each cluster.

9. The computer system of claim 8, further comprising:
identifying photographs that exceed the favorability threshold value; and
generating a personal favorable photo database to store the photographs that exceed the favorability threshold value.

10. The computer system of claim 8, further comprising:
identifying photographs that do not exceed the favorability threshold value; and
generating a personal unfavorable photo database to store the photographs that do not exceed the favorability threshold value.

11. The computer system of claim 8, wherein the favorability threshold value for each photograph is determined by a user's manual selection of favorable or unfavorable photographs.

12. The computer system of claim 8, wherein the favorability threshold value for each photograph is determined by a number of likes or a sentiment of one or more comments that each photograph received on a social media platform.

13. The computer system of claim 8, wherein the favorability threshold value for each photograph is determined by a duration for which the photographs have been stored on a user device.

14. The computer system of claim 8, wherein a basis for organizing the received photographs into one or more clusters is selected from a group consisting of indoor photographs, outdoor photographs, scenery photographs, selfies, photographs depicting different number of people, and photographs depicting a specific individual.

15. A computer program product for determining qualities of user favorable photographs, the computer program product comprising:

one or more computer-readable tangible storage media and program instructions stored on at least one of the one or more non-transitory tangible storage media, the program instructions executable by a processor of a computer to perform a method, the method comprising:

receiving, by a processor, a plurality of photographs from an electronic device;

parsing each photograph;

calculating a favorability value of each photograph;

determining whether the favorability value of each photograph exceeds a favorability threshold value;

organizing the received photographs into one or more clusters based on features of each photograph, wherein a threshold value of favorability for each cluster is determined and each cluster is assigned different sets of threshold values, wherein the threshold value of favorability for each cluster is determined based on a preconfigured storage duration assigned to each of the clusters and a common classification or a common type of the organized photographs in each of the clusters; and generating a classification model for each cluster.

16. The computer program product of claim 15, further comprising:
identifying photographs that exceed the favorability threshold value; and
generating a personal favorable photo database to store the photographs that exceed the favorability threshold value.

17. The computer program product of claim 15, further comprising:
identifying photographs that do not exceed the favorability threshold value; and
generating a personal unfavorable photo database to store the photographs that do not exceed the favorability threshold value.

18. The computer program product of claim 15, wherein the favorability threshold value for each photograph is determined by a user's manual selection of favorable or unfavorable photographs.

19. The computer program product of claim 15, wherein the favorability threshold value for each photograph is determined by a number of likes or a sentiment of one or more comments that each photograph received on a social media platform.

20. The computer program product of claim 15, wherein the favorability threshold value for each photograph is determined by a duration for which the photographs have been stored on a user device.

* * * * *